US011212254B2

(12) United States Patent
Elliott et al.

(10) Patent No.: US 11,212,254 B2
(45) Date of Patent: *Dec. 28, 2021

(54) REAL TIME DYNAMIC CLIENT ACCESS CONTROL

(71) Applicant: AUNIGMA NETWORK SECURITY CORP., Atlanta, GA (US)

(72) Inventors: Karl E. Elliott, Copeville, TX (US); Kenneth W. Garrard, Atlanta, GA (US); Andy Huang, Richmond (CA); Peter Gratzer, Broomfield, CO (US)

(73) Assignee: Aunigma Network Security Corp., Mountain Brook, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,385

(22) Filed: Feb. 25, 2020

(65) Prior Publication Data
US 2021/0014195 A1    Jan. 14, 2021

Related U.S. Application Data

(63) Continuation of application No. 16/027,537, filed on Jul. 5, 2018, now Pat. No. 10,608,989, which is a (Continued)

(51) Int. Cl.
*H04L 9/00* (2006.01)
*H04L 29/06* (2006.01)
(Continued)

(52) U.S. Cl.
CPC .......... *H04L 63/02* (2013.01); *H04L 12/2809* (2013.01); *H04L 41/0813* (2013.01);
(Continued)

(58) Field of Classification Search
CPC .. H04L 63/02; H04L 12/2809; H04L 41/0813
(Continued)

(56) References Cited

U.S. PATENT DOCUMENTS

| 5,091,942 | A | 2/1992 | Dent |
| 5,237,612 | A | 8/1993 | Raith |

(Continued)

FOREIGN PATENT DOCUMENTS

WO    2011053425    5/2011

OTHER PUBLICATIONS

Aiello et al., "Efficient, DoS-Resistant, Secure Key Exchange for Internet Protocols", in Proceedings of the 9th ACM Conference on Computer and Communications Security, Washington, D.C., 2002, 11 pages.

(Continued)

*Primary Examiner* — Christopher J Brown
(74) *Attorney, Agent, or Firm* — Sheppard Mullin Richter & Hampton LLP

(57) ABSTRACT

A system and method for facilitating controlled access by a client device to one or more services provided by a server are disclosed. The client device's access to the services provided by the server may be dynamically controlled by a controller, which may generate instructions to an agent to effectuate the access control. The agent may be configured to control one or more access components associated with the server. The instructions generated by the controller may instruct the agent to cause the access control components to grant or remove the client device's access to the services provided by the server. In some implementations, the controller may generate such instructions based on a status of a session established between the controller and the client device.

18 Claims, 12 Drawing Sheets

Related U.S. Application Data continuation of application No. 14/873,333, filed on Oct. 2, 2015, now Pat. No. 10,021,069.

(60) Provisional application No. 62/142,457, filed on Apr. 2, 2015.

(51) Int. Cl.
*H04L 12/24* (2006.01)
*H04L 12/28* (2006.01)
*H04L 29/12* (2006.01)
*H04L 29/08* (2006.01)

(52) U.S. Cl.
CPC ...... *H04L 41/0823* (2013.01); *H04L 61/6063* (2013.01); *H04L 63/105* (2013.01); *H04L 67/141* (2013.01); *H04L 69/16* (2013.01); *H04L 41/046* (2013.01); *H04L 41/22* (2013.01)

(58) Field of Classification Search
USPC .......................................................... 726/11
See application file for complete search history.

(56) References Cited

U.S. PATENT DOCUMENTS

| | | | |
|---|---|---|---|
| 5,841,871 A | 11/1998 | Pinkas | |
| 6,002,769 A | 12/1999 | McGough | |
| 6,058,189 A | 5/2000 | McGough | |
| 6,219,706 B1* | 4/2001 | Fan | H04L 63/0254 709/225 |
| 6,256,739 B1* | 7/2001 | Skopp | G06F 21/31 709/229 |
| 6,266,413 B1 | 7/2001 | Shefi | |
| 6,445,797 B1 | 9/2002 | McGough | |
| 6,487,660 B1 | 11/2002 | Vanstone | |
| 6,891,952 B1 | 5/2005 | Puehlhoefer | |
| 7,139,679 B1 | 11/2006 | McGrew | |
| 7,290,281 B1 | 10/2007 | McGrew | |
| 7,411,917 B1* | 8/2008 | Hardie | H04L 29/12528 370/252 |
| 7,774,841 B2 | 8/2010 | Wu | |
| 7,818,435 B1* | 10/2010 | Jellinek | H04L 67/2895 709/229 |
| 7,818,735 B1 | 10/2010 | Vook | |
| 7,937,759 B2 | 5/2011 | Wu | |
| 8,127,355 B2 | 2/2012 | Wu | |
| 8,261,350 B2 | 9/2012 | Wu | |
| 8,370,920 B2 | 2/2013 | Garrard | |
| 8,510,831 B2 | 8/2013 | Wu | |
| 8,719,903 B1* | 5/2014 | Kilday | G06F 21/62 726/4 |
| 8,745,723 B2 | 6/2014 | Garrard | |
| 9,438,592 B1 | 9/2016 | Garrard | |
| 2003/0149876 A1 | 8/2003 | McGough | |
| 2003/0177391 A1 | 9/2003 | Ofek | |
| 2004/0250061 A1 | 12/2004 | Yamauchi | |
| 2005/0055570 A1* | 3/2005 | Kwan | H04L 63/08 726/4 |
| 2005/0144352 A1 | 6/2005 | Wu | |
| 2005/0198489 A1 | 9/2005 | Wallace | |
| 2006/0034456 A1 | 2/2006 | McGough | |
| 2006/0143453 A1 | 6/2006 | Imamoto | |
| 2007/0266241 A1 | 11/2007 | Wu | |
| 2008/0016354 A1 | 1/2008 | Wilding | |
| 2008/0046727 A1 | 2/2008 | Kanekar | |
| 2008/0184031 A1 | 7/2008 | McGough | |
| 2008/0229105 A1 | 9/2008 | Jeffries | |
| 2009/0037725 A1 | 2/2009 | Farrugia | |
| 2009/0055642 A1* | 2/2009 | Myers | H04L 9/3226 713/155 |
| 2009/0067422 A1 | 3/2009 | Poppe | |
| 2009/0070871 A1 | 3/2009 | Poppe | |
| 2010/0242112 A1 | 9/2010 | Wu | |
| 2010/0287610 A1 | 11/2010 | Joffray | |
| 2011/0099623 A1 | 4/2011 | Garrard | |
| 2011/0099630 A1 | 4/2011 | Wu | |
| 2012/0124383 A1 | 5/2012 | Wu | |
| 2013/0219485 A1 | 8/2013 | Garrard | |
| 2015/0201107 A1* | 7/2015 | Hori | H04N 1/21 358/1.15 |

OTHER PUBLICATIONS

Aura et al., "Stateless Connections" in Proc. of International Conference on Information and Communications Security (ICICS '97), Lecture Notes in Computer Science, vol. 1334, Springer, Nov. 1997, pp. 87-97.

Aura_et al., "DOS-Resistant Authentication with Client Puzzles", in Proc. of the 8th International Workshop on Security Protocols, Apr. 2000, 8 pages.

Dwork et al., "Pricing via Processing or Combatting Junk Mail", in E. Brickell, editor, Proceedings of Advances in Cryptology—Proc. CRYPTO '92, vol. 1323 of LNCS, Santa Barbara, CA USA, Aug. 1992, pp. 139-147.

Juels et al., "Client Puzzles: A Cryptographic Countermeasure Against Connection Depletion Attacks", in Proc. of the Network and Distributed Systems Security Symposium (NDSS '99), pp. 151-165, Feb. 1999.

Leiwo, Jussipekka, et al., "Towards Network Denial of Service Resistant Protocols", in Proc. of the 15th International Information Security Conference (IFIP?SEC), Aug. 2000, 10 pages.

Perlman, Radia, "Understanding IKEV2: Tutorial, and Rationale for Decisions", draft-ietf-ipsec-ikev2-tutorial-01.txt, Feb. 2003.

* cited by examiner

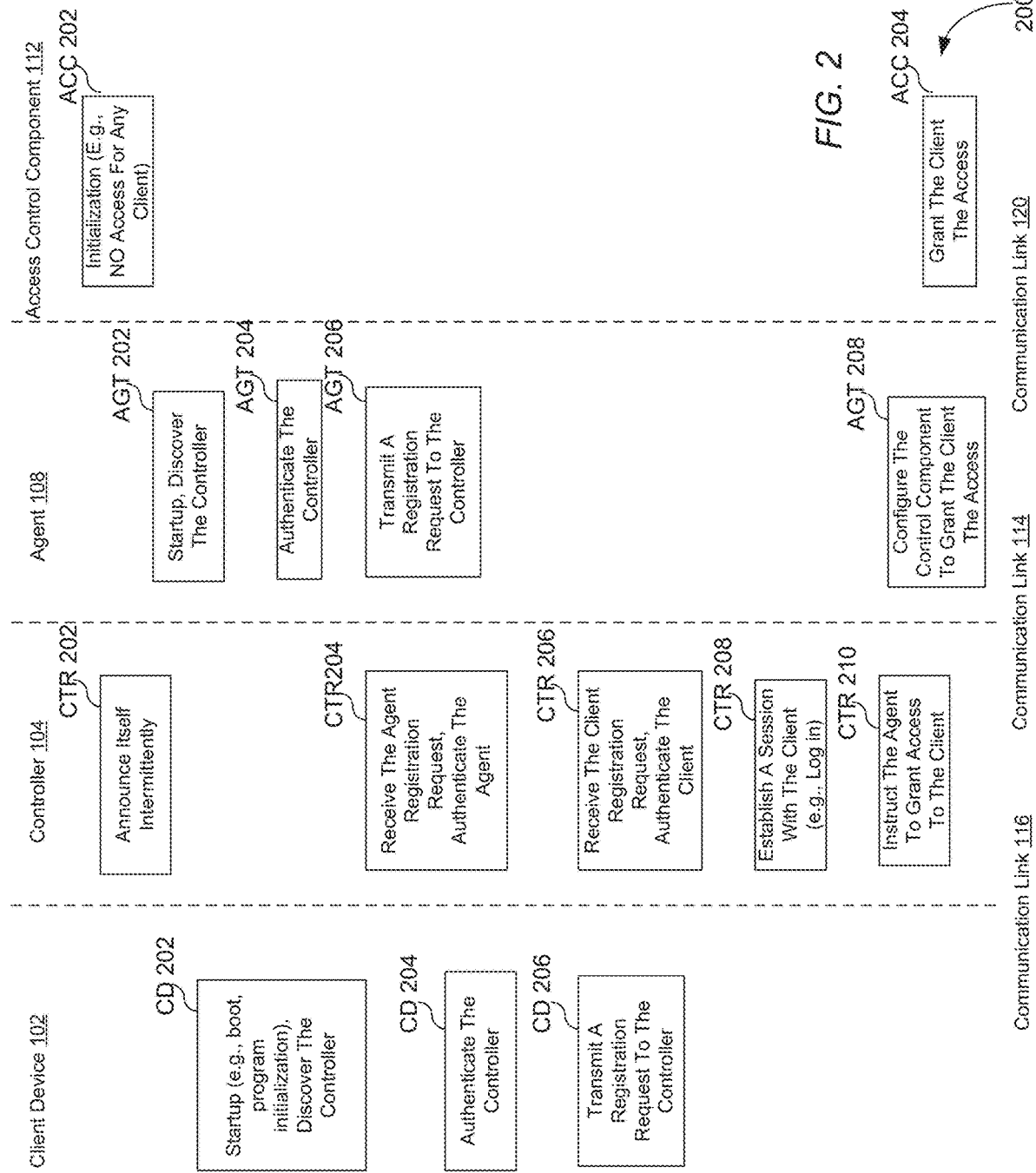

REAL TIME DYNAMIC CLIENT ACCESS CONTROL

CROSS-REFERENCE TO RELATED APPLICATIONS

This application is a continuation of pending U.S. patent application Ser. No. 16/027,537, filed Jul. 5, 2018, entitled "REAL TIME DYNAMIC CLIENT ACCESS CONTROL", which is a continuation of U.S. patent application Ser. No. 14/873,333, filed Oct. 2, 2015, entitled "REAL TIME DYNAMIC CLIENT ACCESS CONTROL" (which issued as U.S. Pat. No. 10,021,069 on Jul. 10, 2018), which claims priority to U.S. Provisional Patent Application Ser. No. 62/142,457, filed Apr. 2, 2015, entitled "REAL TIME DYNAMIC ACCESS CONTROL," which are hereby incorporated herein by reference in their entirety.

FIELD OF THE INVENTION

The invention generally relates to facilitating controlled access by a client device to a service or data provided by a server.

BACKGROUND OF THE INVENTION

Client-server architecture (client/server) is a network architecture in which a device or process on the network is either a client or a server. In the client-server architecture, a server provides one or more services, which may be defined by the provider(s), to a client device. For example, an appliance with network capability, such as a smart refrigerator, may provide various services to a client device, such as a smartphone. For instance, the smart refrigerator may allow the smartphone to remotely read and/or control the temperature of the smart refrigerator via a wireless network. In that context, the smart refrigerator is a server. As another example, a networked computer may provide a data service to a client device such that the client device may send and/or receive data to and/or from a data store, such as file storage, coupled to the networked computer. In that context, the networked computer is a server. To facilitate a user to use the services provided by the server in the client-server architecture, the client device typically provides an interface to allow a user to request the services provided by the server and to display the results the server returns. The server typically waits for requests to arrive from client device and then responds to them.

Controlling a client device's access to a service provided by a server is generally known in the art. Various schemes of access control known in the art may be categorized into user-level and device-level control schemes. User-level access control typically involves controlling user access to certain services provided by the server via user credentials and/or user access matrix(ces). User credentials of a user, i.e., user name and password, typically facilitate authentication of the user to the server, and user access matrix(ces) typically defines which service(s) the user has access to. For example, it is well known in the art to challenge a user to provide user credentials to log into an operating system on a server, such as a UNIX server. Many applications are also known to have access control at user level by challenging users to provide user credentials specific to the applications. Once a user is authenticated by the credentials provided by the user, the applications typically provide the user access to one or more services of the applications.

Device-level access control typically involves controlling a client device's access to the server via device identities and device access matrices. Device-level access control is typically performed at an access control component (e.g., at a firewall component) of the server. For example, incoming data packets may be examined by a firewall component such that data packets not originating from unauthorized client device(s) may not have access to the server.

SUMMARY OF THE INVENTION

In accordance with one aspect of the invention, an enhanced system and method for facilitating controlled access by a client device to one or more services provided by a server are disclosed. The controlled access may be facilitated through a controller. The controller may be operatively connected to the client device and an agent component that is operatively connected to the server. The agent component may be configured such that it is capable of dynamically configuring an access control component associated with the server. The client device's access to the services provided by the server may be dynamically controlled by the controller such that the controller issues instructions to the agent component to cause the agent component to dynamically grant or remove the client device's access to the services provided by the serve via the access control component. The controller may issue instructions to the agent component to grant the client device access to the services provided by the server after the client device has registered with the controller and has authenticated itself to the controller. The controller may issue instructions to the agent component to remove the access by the client device after a disconnect request is received or after the client device becomes inactive in a manner predefined by the provider(s) of the controller. This provides an enhanced access control mechanism by which client device's access to a service provided by a server may be dynamically controlled by a dedicated controller capable of authenticating client devices. This access mechanism may be deployed in an existing client/server environment by employing existing access control components already in use (e.g., a firewall) in the client/server environment.

A system configured to facilitate access control for a client device may include one or more processors configured to execute computer program modules. The processors may operate in a client/server architecture with one or more client devices. The processors may be configured to execute one or more of: a registration component, an authentication component, a session component, a client access configuration component, and/or any other components.

The registration component may be configured to receive a client registration request to register a client device. The registration component may be configured to receive an agent registration request to register an agent.

The authentication component may be configured to authenticate the client device in response to the client registration request being received. The authentication component may be configured to authenticate the agent in response to the agent registration request being received.

The session component may be configured to establish a session with the client device, to communicate with the client device through the session, and to terminate the session with the client device.

The client access configuration component may be configured to generate instructions to be transmitted to the agent for removing or granting client device's access to the service(s) provided by the server. In some implementations, the client access configuration component may be configured to remove or grant client device's access to the service(s) provided by server automatically based on the status of the session established between the client device and the controller. For example, when the session is established for the first time or subsequently (i.e., from a disconnected state to a connected state), the client access configuration component may transmit an instruction to the agent instructing the agent to grant client device 102 access to the server. Conversely, when the session is terminated, the client access configuration component may transmit an instruction to the agent instructing the agent to remove client device's access to the service(s) provided by server.

Other objects and advantages of the invention will be apparent to those skilled in the art based on the following drawings and detailed description.

BRIEF DESCRIPTION OF THE DRAWINGS

FIG. 2 illustrates a process by which the client device, agent, and the access control component shown in FIGS. 1A and 1B are registered at the controller also shown therein.

DETAILED DESCRIPTION

Figure 1A:
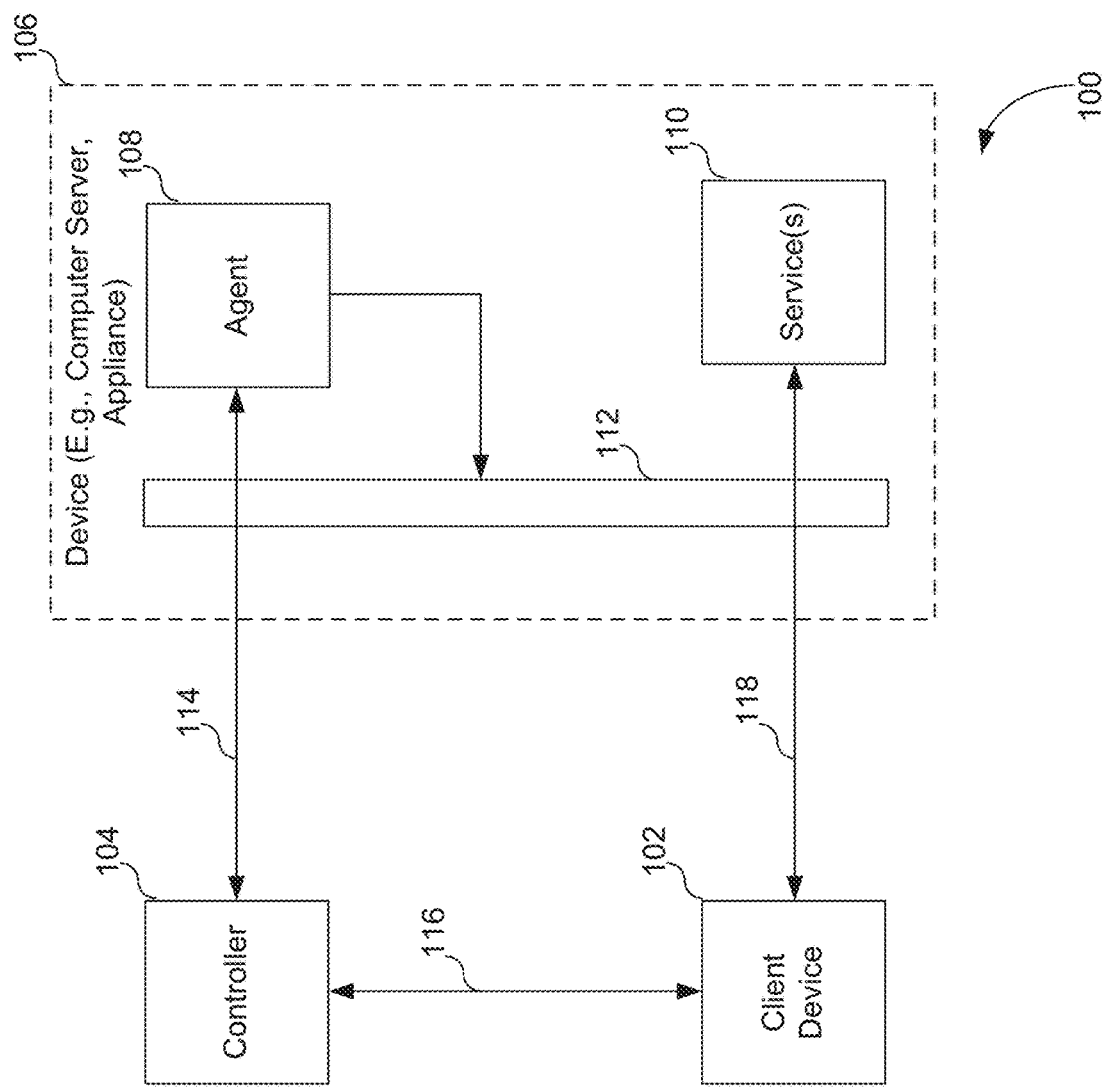
FIG. 1A generally illustrates one exemplary system facilitating access control by a client device to a service in accordance with the disclosure.
Figure 1B:
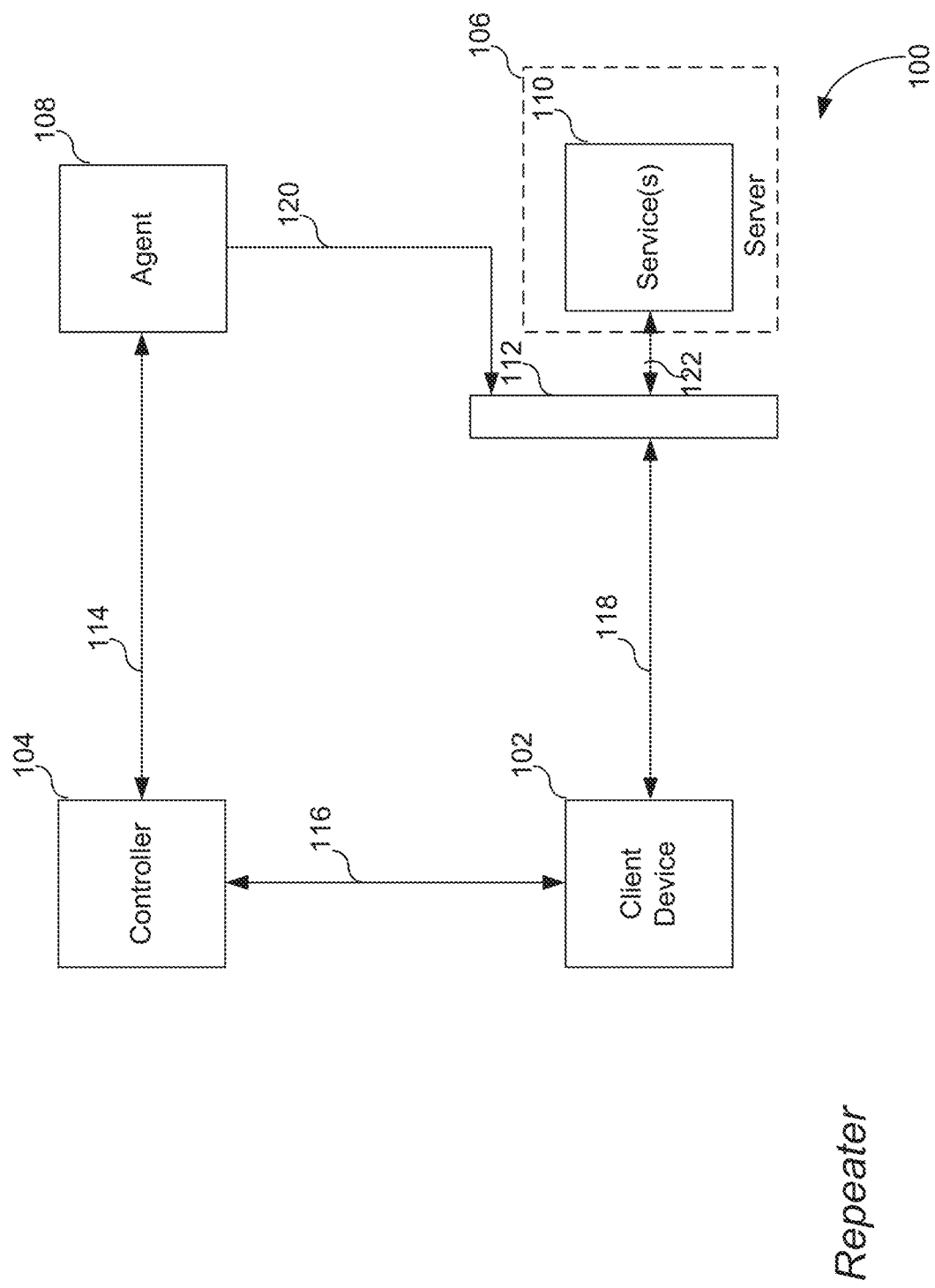
FIG. 1B generally illustrates another exemplary system facilitating access control by a client device to a service in accordance with the disclosure.

FIGS. 1A and 1B generally illustrate exemplary system 100 capable of controlling a client device's access to a server in accordance with the disclosure. In particular, the present disclosure generally pertains to facilitating access control to one or more services provided by the server. As shown in FIG. 1A, service(s) 110 may be provided by the server 106 and client device's access to the service(s) 110 may be controlled. The server 106 may include a computer system, a host computer, a device, an appliance, and/or any other type(s) of platform(s) capable of providing one or more services to a client device, such as the client device 102 shown in FIG. 1A. By way of non-limiting example, the server 106 may be a file server capable of providing file services to the client device 102. As another example, the server 106 may be a media content server capable of serving media content to the client device 102. As yet another non-limiting example, the server 106 may be a smart appliance capable of providing remote control services to the client device 102. Other examples of the server 106 are contemplated. The service(s) 110 provided by server 106 may be defined and made available by provider(s), administrator(s), manufacturer(s), and/or any other entities related to the server 106. For example, service(s) 110 may include data storage services, media content services, or remote control services provided by server 106 corresponding to the aforementioned examples. Other examples of services 110 are contemplated.

As shown, for facilitating the access control mechanism in accordance with disclosure, server 106 may be configured to comprise an agent 108, an access control component 112, and/or any other components. Agent 108 may be configured to dynamically configure the access control component 112. To achieve this, agent 108 may be operatively connected to the control access component 112. Agent 108 may include a process, a program, firmware, an application, dedicated circuitry, computer logic, and/or any other type of software or hardware capable of controlling the access control component 112. In one embodiment of the disclosure, agent 108 is implemented as a software component of the server 106.

Access control component 112 may be configured to examine incoming data to the server and prevent data originating from unauthorized client devices from accessing server 106. Access control component 112 may include a process, a program, firmware, an application, dedicated circuitry, computer logic, and/or any other type of software or hardware capable of examining incoming data and filtering data as discussed herein. In one embodiment of the disclosure, the access control component 112 is implemented as a firewall of the server 108 and is dynamically configurable via commands. Configuring a firewall component with access rules using commands, such as shell commands, is generally known in the art. For example, Ocean Park Technologies describes various examples of configuring a firewall component on a Linux-based platform via iptable commands. The examples provided by Ocean Park Technologies for configuring a firewall component are provided in Appendix A.

As also shown in FIG. 1A, in system 100, the controller 104 may be operatively connected to server 106, and, in particular, may be operatively connected to the agent 108, via a communication link 114. The communication link 114 may include any wired and/or wireless link suitable for transmitting data between controller 104 and server 106. In one embodiment of the disclosure, the communication link 114 is a link facilitating a networked communication (wired and/or wireless) between controller 104 and server 106. However, this is not necessarily the only case. The communication link 114 may include a point-to-point communication channel between controller 104 and server 106. For example, the communication link 114 may be a dedicated cable channel between server 106 and controller 104.

The controller 104 may include a process, a program, firmware, an application, dedicated circuitry, computer logic, and/or any other type of software or hardware capable of performing the functions attributed to controller 104 as described herein. In one embodiment of the disclosure, controller 104 is implemented as a software component on a host computer operatively connected to server 106. In that embodiment, the combination of the software component and the host computer is considered as the controller 104.

As also shown, for facilitating the access control mechanism in accordance with the disclosure, the client device 102 may be operatively connected to the controller 104 via a communication link 116. The communication link 116 may include any wired and/or wireless link suitable for transmitting data between controller 104 and client device 102. In one embodiment of the disclosure, the communication link 116 is a link facilitating a networked communication (wired and/or wireless) between controller 104 and client device 102. However, this is not necessarily the only case. In some examples, the communication link 116 may include a point-to-point communication channel between controller 104 and client device 102. For example, the communication link 116 may be a dedicated cable channel between client device 102 and controller 104.

The client device 102 may be a smartphone, a tablet, a laptop computer, a netbook, a desktop computer, a terminal device, a handheld device, a wearable device, a remote control device, a game console, a smart TV, a printer, a set top box, and/or any other type of devices capable of requesting and/or receiving service(s) 110 provided by server 106 via communication link 118 shown in FIG. 1A. The communication link 118 may include any wired and/or wireless link suitable for transmitting data between server 106 and client device 102. In one embodiment of the disclosure, the communication link 118 is a link facilitating a networked communication (wired and/or wireless) between server 106 and client device 102. However, this is not necessarily the only case. In some examples, the communication link 118 may include a point-to-point communication channel between server 106 and client device 102. For example, the communication link 118 may be a dedicated cable channel between server 106 and client device 102.

FIG. 1B illustrates another example of system 100 facilitating client device access control to the service(s) provided by a server in accordance with the disclosure. It will be described with comparison to FIG. 1A. The system 100 shown in FIG. 1B is different from the one shown in FIG. 1A with respect to the arrangement of the agent 108 and access control component 112. In FIG. 1B, as shown, agent 108 is located outside of the server 106. In this example, agent 108 is a computing platform (e.g., a server computer) configured by one or more software components thereon to perform the functions attributed to the agent 108 as described herein. However, this is merely illustrative. As another example, the agent 108 may be a relay device or a repeater device that re-transmits data/messages (from the physical layer perspective, these are signals) to an appropriate access control component 112. As also shown in this example, the access control component 112 may be located outside of the server 106. For example, the access control component 112 may be a gateway server with firewall and configured to control access to servers including server 106 within a particular network. As another example, without limitation, the access control component 112 may be a router device or a switch device with authentication capability. In that example, the access control component 112 (i.e., the router device) may be configured by agent 108 via a communication link 120 to control routing or switching of data packets from router device 112 to server 106 over a communication link 122 between the access control component 112 and server 106. The communication link 122 and as well as the communication link 120 may include any wired and/or wireless link suitable for transmitting data. In one embodiment of the disclosure, the communication link 120 and/or link 122 is a link facilitating a networked communication (wired and/or wireless). However, this is not necessarily the only case. In some examples, the communication link 120 and/or link 122 may include a point-to-point communication channel between agent 108 and access control component 112, and point to point link between access control component 112 and server 106. For example, the communication link 120 may be a dedicated cable channel between agent 108 and access control component 112.

By way illustration, in one example, the client device 102 may be facilitated to access server via agent 108 in accordance with the system architecture shown in FIG. 1B. In that example, the agent 108 may be configured to dynamically configure the access control component 112 such that data packets from the client device 102 may be routed/switched to server 106. Accordingly, when the client device 102 initiates data communication with server 106 for access to services 110 (e.g., web services provided by server 106), the client device 102 may not be required to specify an addressable identification of the server 106 (e.g., a URL or an IP address of the server 106). For instance, the client device 102 may only need to specify a particular webpage that it wants to download in an http get request without specifying a URL for the webpage; and the access control component 112 (as configured by the agent 108) may direct the http get request from the client device 102 to server 106.

Figure 3:
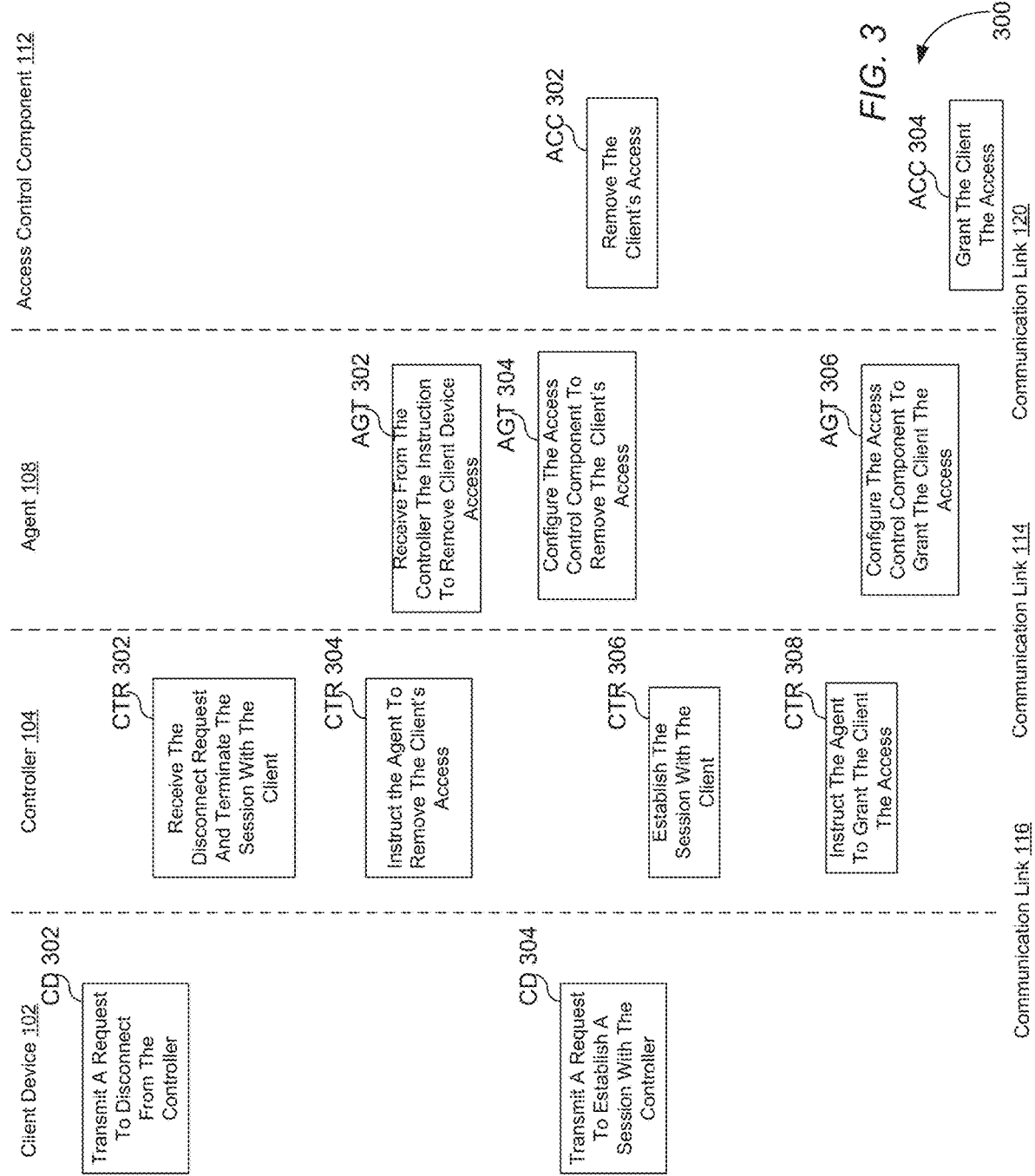
FIG. 3 illustrates a process by which access by a client device to a service may be removed and granted at the controller in accordance with one embodiment of the disclosure.

With the general architecture of system 100 having been described in FIGS. 1A and 1B, attention is now directed to FIG. 2 and FIG. 3, both of which describe various operations that may be performed by the elements shown in FIGS. 1A and 1B to implement the access control mechanism in accordance with the disclosure. FIG. 2 illustrates a process 200 by which the client device 102, agent 108, and the access control component 112 shown in FIGS. 1A and 1B are registered at the controller 104 to facilitate the access control mechanism in accordance with the disclosure. It will be described with reference to FIGS. 1A and 1B. The operations of process 200 presented below are intended to be illustrative. In some embodiments, process 200 may be accomplished with one or more additional operations not described and/or without one or more of the operations discussed. Additionally, the order in which the operations in process 200 are illustrated in FIG. 2 and described below is not intended to be limiting.

As shown, at an operation CTR 202, the controller 104 may announce itself intermittently via the communication links 114 and/or 116. By way of illustration, at CTR 202, the controller 104 may broadcast one or more control packets using the communication links 114 and/or 116, wherein the control packets may include information indicating information regarding the controller 104. The information regarding the controller 104 may include the identity of the controller 104, the network address of the controller 104, the physical location of the controller 104, one or more services (e.g., service(s) 110) associated with the controller 104, and/or any other information. The frequency at which the controller 104 performs operation CTR 202 may be preset by the provider(s), administrator(s), manufacturer(s), and/or any other entities related to the controller 104. For example, without limitation, the administrator(s) of the controller 104 may preset the controller 104 to announce itself every minute onto the network(s) via communication links 114 and/or 116.

At an operation CD 202, client device 102 may start up. For example, the client device 102 may be powered on and perform a preset initialization process. As also shown, at CD 202, the client device 102 may discover the controller 104, for example, by receiving the control packets broadcasted by the controller 104 at CTR 202. In some examples, one or more applications on the client device 102 may initialize when the client device 102 starts up at operation CD 202.

At an operation AGT 202, agent 108 may start up. For example, the agent 108 may be powered on and perform a preset initialization process. As also shown, at AGT 202, the agent 108 may discover the controller 104, for example, by receiving the control packets broadcast by the controller 104 at CTR 202.

At an operation ACC 202, access control component 112 may start up. Also at ACC 202, the access control component 112 may initialize such that client device 102 is not granted any access to the service(s) 110 provided by the server 106.

At an operation CD 204, the client device 102 may authenticate the controller 104. In some examples, the authentication performed at CD 204 by the client device 102 may be done based on the control packets broadcast by the controller at operation CTR 202. In some other examples, the client device 102 may challenge the controller 104 to provide credentials to authenticate the controller 104 to the client device 102.

At an operation AGT 204, the agent 108 may authenticate the controller. In some examples, the authentication performed at AGT 204 may be done based on the control packets broadcast by the controller at operation CTR 202. In some other examples, the agent 108 may challenge the controller 104 to provide credentials to authenticate the controller 104 to the agent 108.

At an operation CD 206, the client device 102 may transmit a registration request to register itself to the controller 104, indicating the client device 102 is online. In some examples, the registration request may be automatically transmitted as instructed by a process, an application, a program, software, hardware, and/or any other components on the client device 102. As an example, a hardware component, such as a RF transceiver on the client device 102, may be configured to transmit a registration request to register the RF transceiver and/or the client device 102 to the controller 104, indicating the RF transceiver and/or the client device 102 is online. As another example, an application, such as a banking terminal application, may be configured to automatically transmit the registration request to the controller 104 after the controller 104 is authenticated. In some other examples, the registration request transmitted at CD 206 may be manually instigated by an administrator, a user, and/or any other entities associated with the client device 102. For example, a user of the client device 102 may initiate the transmission of the registration request to the controller 104 via a user interface presented on client device 102.

In some examples, the client registration request transmitted by the client device 102 may include information identifying the client device 102. Such information may include a name (e.g., computer name) of the client device 102, identification number(s) associated with one or more hardware and/or software components on the client device 102 (e.g., a serial number associated with the R/F transceiver of the client device 102, a MAC address of the network interface card of the client device 102, and/or any identification number associated with the hardware and/or software components on the client device 102) a network address of the client device 102 (e.g., an IP address of the client device 102) and/or any other information identifying the client device 102. In some examples, the client registration request transmitted by the client device 102 may include user information regarding the user(s) active on the client device 102. The user information may include a username and/or any other user identification information.

At an operation AGT 206, agent 108 may transmit a registration request to register itself to the controller 104. In some examples, without limitation, agent 108 may be configured to transmit the registration request at AGT 206 in response to the controller 104 having been authenticated at AGT 204.

At an operation CTR 204, controller 104 may receive the registration request from the agent 108 and authenticate agent 108. At an operation CTR 206, the controller 104 may receive the registration request from the client device 102 and authenticate client device 102.

At an operation CTR 208, the controller 104 may establish a session with the client device 102 after the client device is successfully registered to the controller 104. The session established at CTR 208 may include session information indicating a session identification number, a state of states of the session, a time period associated with the session, a session token, and/or any other session information.

At an operation CTR 210, the controller 104 may generate one or more instructions instructing the agent 108 to grant client device 102 access to service(s) 110 provided by the server 106, in response to the session having been successfully established between the client device 102 and controller 104 at CTR 208. Also at an operation CTR 210, the controller 104 may transmit the aforementioned instructions to the server 106 over the communication link 114.

At an operation AGT 208, the agent 108 may configure the access control component 112 to grant client device 102 access to the service(s) 110. As discussed above, in some examples, the agent 108 may configure the access control component 112 at AGT 208 by issuing one or more commands to set up an access rule permitting the data coming from client device 102 to enter server 106. In one embodiment, operation AGT 208 involves issuing an iptable command to allow data coming from the client device 102 to enter the server 106 through a network interface of the server 106.

At an operation ACC 204, after receiving the configuration by the agent 108 at AGT 208, the access control component 112 may grant the client device 102 the access to the service(s) 110 provided by the server 106 in response to the configuration performed by the agent 108 at AGT 208.

In one embodiment, process 200 illustrated in FIG. 2 and described above is implemented by the transport and security protocols described in U.S. Pat. No. 8,745,723 "System and Method For Providing Unified Transport and Security Protocols," which is incorporated by reference herein in its entirety. In that embodiment, prior to process 200, information regarding client device 102 is recorded in storage associated with the controller 104. A filter value is generated for the client device 102 at the controller 104 and a hash value corresponding to the filter value is transmitted to the client device at a configuration stage of client device 102. During the process 200 in that embodiment, at operation CD 206, the client device 102 encapsulates the registration request with the hash value, and, at operation CTR 206, the controller 104 receives the registration request from the client and authenticates the client device 102 by comparing the hash value encapsulated in the request with the filter value generated for the client device 102. If a match is found between the hash value and the filter value, the controller 104 authenticates the client device 102 and establishes a session with the client device 102. If a match is not found between the hash value and the filter value, a session is not established between the controller 104 and the client device 102.

FIG. 3 illustrates a process by which access by a client device to a service may be removed and granted at the controller in accordance with one embodiment of the disclosure. It will be described with reference to FIGS. 1A and 1B. The operations of process 300 presented below are intended to be illustrative. In some embodiments, process 300 may be accomplished with one or more additional operations not described and/or without one or more of the operations discussed. Additionally, the order in which the operations of process 300 are illustrated in FIG. 3 and described below is not intended to be limiting.

As shown, at an operation CD 302, client device 102 may transmit, over the communication line 116, a request to disconnect from the controller 104. For example, the request to disconnect may be transmitted automatically at CD 302 when the client device 102 is powered down. As another example, the request to disconnect may be transmitted at CD 302 in response to an instruction from a user of the client device 102. For instance, a user interface may be provided on the client device 102 to enable a user to disconnect the client device 102 from the controller 104. As another example, the request to disconnect may be transmitted automatically by an application, a process, a program, software, firmware, hardware, and/or any other components on the client device 102 when a user of the client device 102 stops using a process, an application on the client device 102, or the client device 102 in a manner that is predefined by the provider(s), administrator(s), manufacturer(s), and/or any other entities related to client device 102. For instance, the request to disconnect may be transmitted at CD 302 after the user is idle on the client device 102 for a predetermined amount of time or may be transmitted when the client device is restarted. Other situations where the request to disconnect may be transmitted by the client device 102 are contemplated. In some examples, an interface may be provided to enable a user to manually have the request to disconnect transmitted to the controller 104. For example, an interface may be provided on the client device such that a user may request to "log-off" the client device 102 from the controller 104. As another example, an interface may be provided on an administration server connected to the controller such that an administrator of system 100 may request to "log-off" the client device 102 from the controller 104.

At an operation CTR 302, the controller 104 may receive the disconnect request transmitted by the client device 102 at operation CD 302. Also at operation CTR 302, the controller 104 may terminate the session that was established with the client device 102 in response to the disconnect request being received at the controller 104. For example, the controller 104 may "log out" the client device 102 upon receiving the disconnect request from the client device 102. In implementations, this may be achieved by clearing or resetting the session information regarding the client device 102 at controller 104.

At an operation CTR 304, the controller 104 may generate one or more instructions instructing agent 108 to remove the client device 102 access to the service(s) 110 provided by the server 106. Also at operation CTR 304, the controller 104 may transmit the generated instruction to the agent 108 over the communication link 104.

At an operation AGT 302, the agent 108 may receive the instruction(s) transmitted by the controller 104 at operation CTR 304.

At an operation AGT 304, in response to the instruction(s) being received at operation AGT 302, the agent 108 may configure the access control component 112 to remove the client device 102's access to the service(s) 110. As discussed above, in some examples, operation AGT 304 may involve issuing commands to configure the access control component 112 such that access to the service(s) 110 provided by server 106 may be removed. In one embodiment, an iptable remove command is issued by the agent 108 to remove client device 102 access to server 106 in response to the instruction(s) received from controller 104.

At an operation ACC 302, the access control component 112 receives the configuration by the agent 108 and removes the client device 102's access to the service(s) 110 provided by the server 106.

At an operation CD 304, the client device 102 transmits a request to establish a session with the controller 104. In some examples, the client device 102 may transmit such a request upon a determination that the user is active on the client device 102. For example, an interface may be provided on the client device 102 such that a user may request to "log-in" the client device 102 to the controller 104. As another example, an interface may be provided on an administration server connected to the controller 104 such that an administrator of system 100 may request to "log-in" the client device 102 to the controller 104. In some examples, the client device 102 may transmit such a request in response to an instruction from an application on the client device 102. For example, an application on the client device 102 may automatically generate an instruction to have the client device 102 to transmit such a request during the initialization of the application. Other examples are contemplated.

At an operation CTR 306, the controller 104 receives the request transmitted by the client deice 102 at operation CD 304 and establishes the session with client device 102 accordingly.

At an operation CTR 308, the controller 104 generates one or more instructions instructing the agent 108 to grant the client device 102 access to the service(s) 110.

At an operation AGT 306, the agent 108 receives the instruction(s) generated at CTR 308 from the controller 104 and configures the access control component 112 to grant the client device 102 access to the service(s) 110.

At an operation ACC 304, the access control component 112 receives the configuration generated by the agent 108 at AGT 306 and grants the client device 102 the access to the service(s) 110 accordingly.

It should be understood the process 300 described above may repeat the operations therein to remove the client device 102's access to the service(s) 110 and grant the client device 102 access to the service(s) 110 alternatively. That is, although only one sequence of operations for access removal and granting is illustrated in FIG. 3, this sequence may be repeated in the process 300 however many times.

Figure 4:
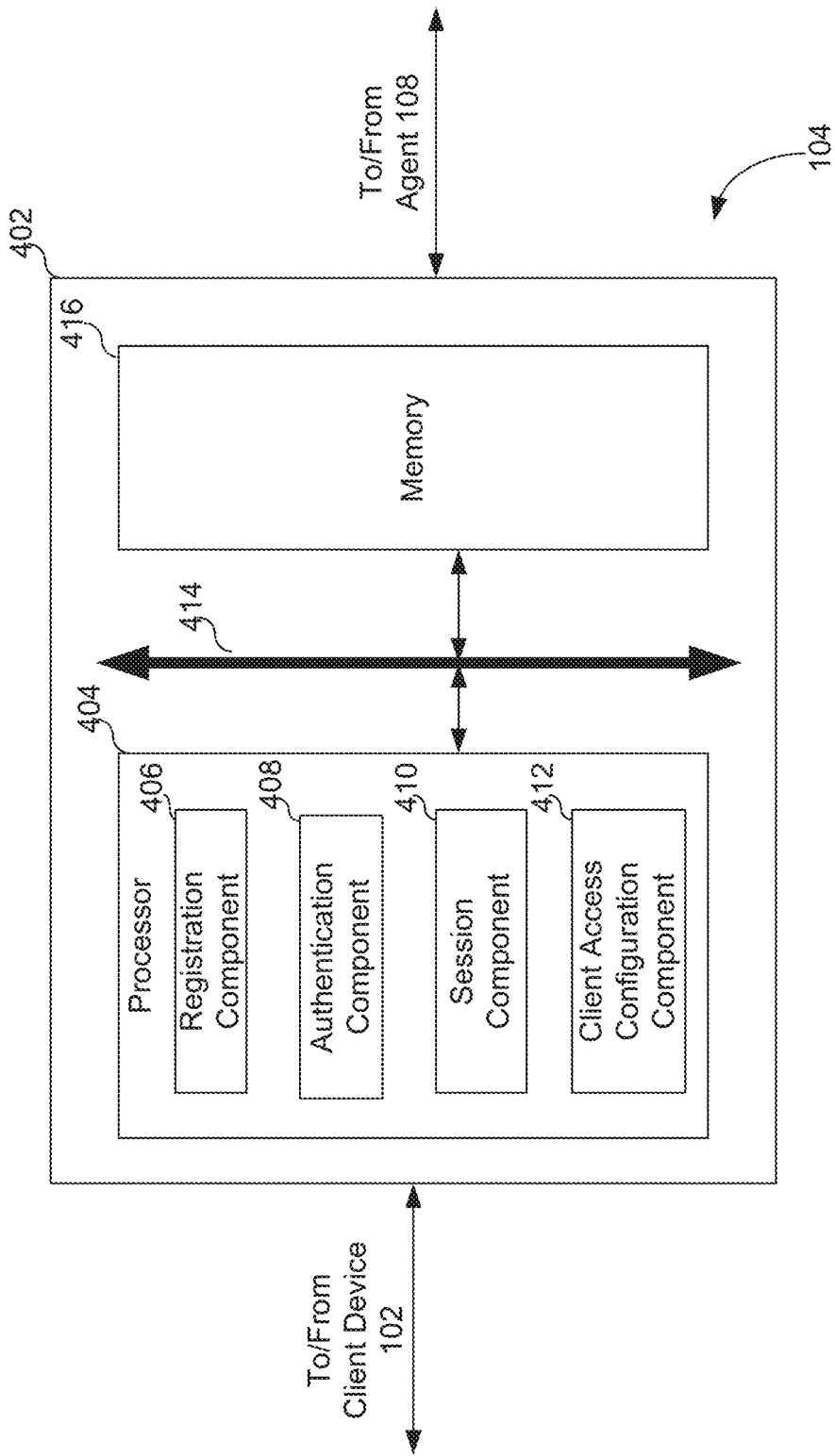
FIG. 4 illustrates one example of the controller shown in FIG. 1A and FIG. 1B.
Figure 5:
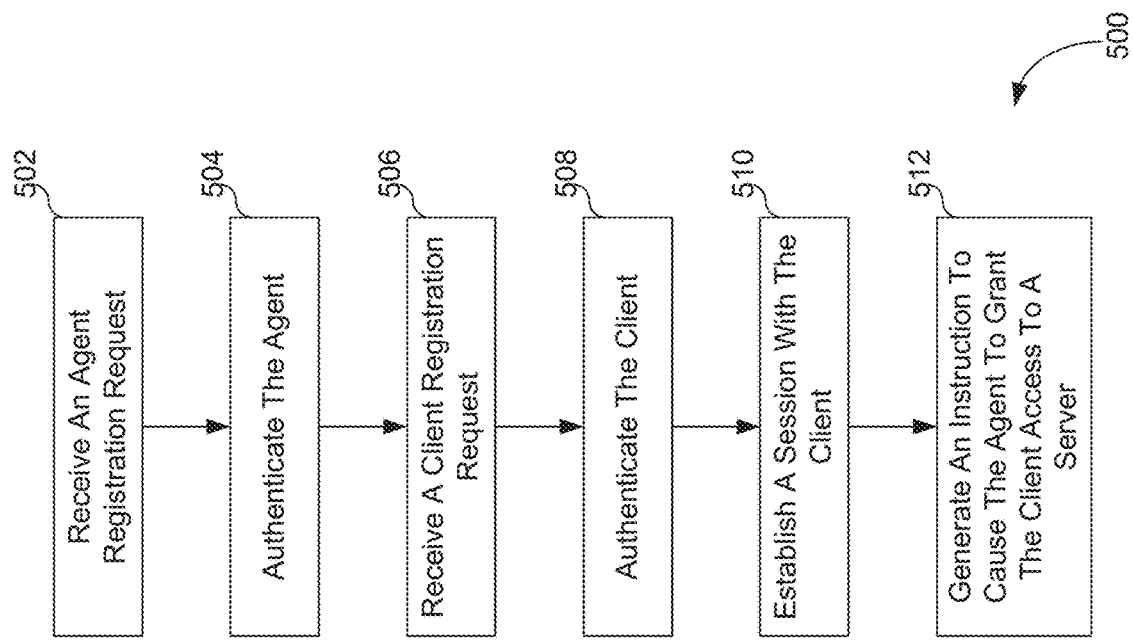
FIG. 5 is a flow diagram illustrating an exemplary method of registering an agent and a client device at the controller shown in FIG. 4 in accordance with one embodiment of the disclosure.
Figure 6:
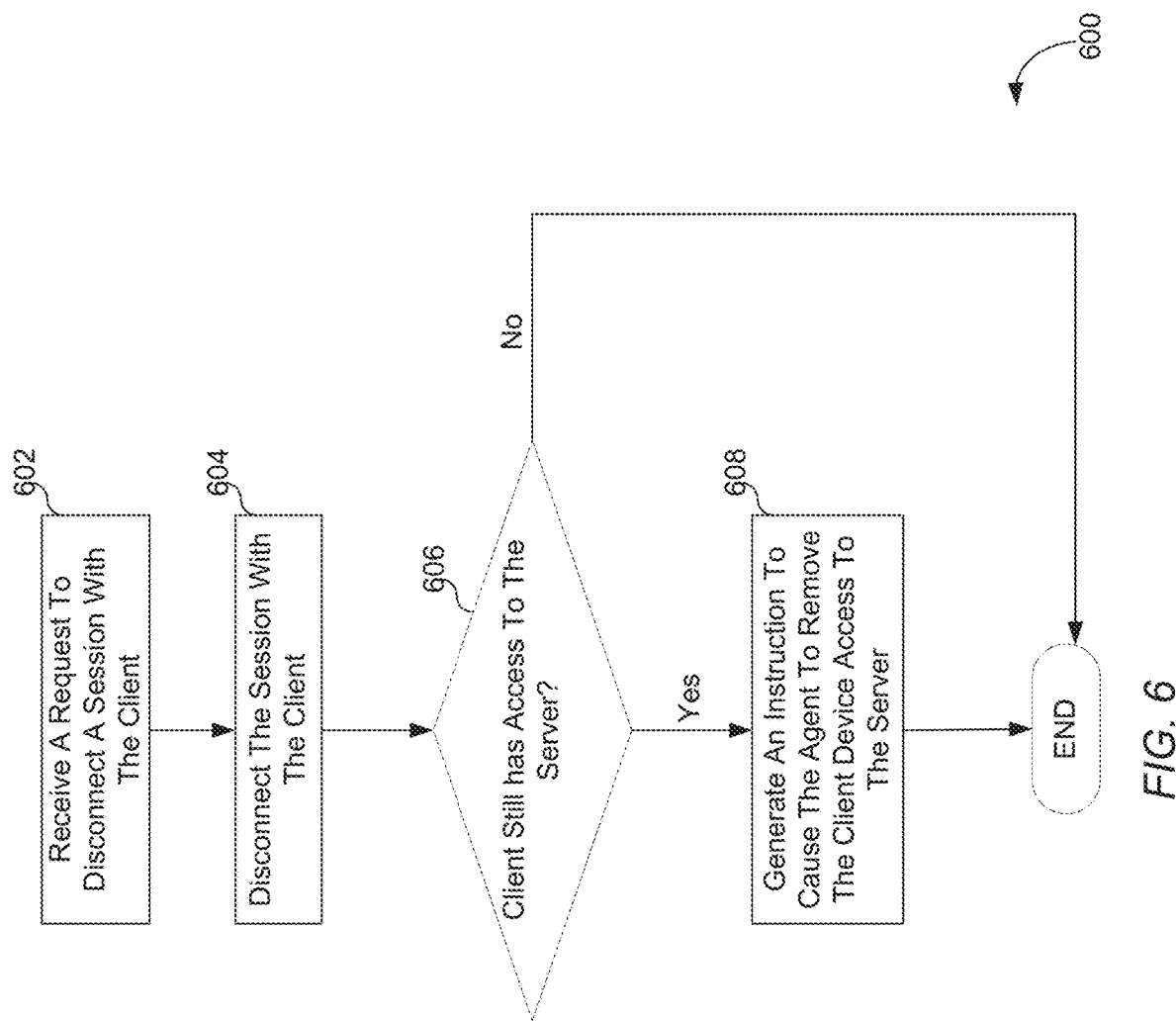
FIG. 6 is a flow diagram illustrating an exemplary method of removing a client device's access at the controller shown in FIG. 4 in accordance with one embodiment of the disclosure.

With the processes to register a client device 102 and remove/grant client device 102's access to the service(s) 110 provided by the server 106 having been generally described above and illustrated in FIGS. 2 and 3, attention is now directed to FIGS. 4-6, which illustrate exemplary structure and operations of controller 104 in detail. FIGS. 4-6 will be described with reference to FIGS. 1-3.

FIG. 4 illustrates one example of the controller 104 shown in FIGS. 1A and 1B. As shown, the controller 104 may include a suitable device 402 including, for example, a computer server, a laptop computer, a desktop computer, handheld device (e.g., mobile or smart phone, tablet, etc.), a media center, a gaming console, a set top box, a printer, or any other suitable device 402, just to name few. In this example, the device 402 included in controller 104 employs a processor 404 operatively connected to system memory 416 via a system bus 414. This is merely illustrative, as device 402 included in controller 104 may be implemented with more or fewer processors than those shown in FIG. 4. Although not shown, in some examples, the controller 104 may include an input device, such as, but not limited to, a touch screen, motion sensor, mouse, trackball, touchpad, digitizing tablet, joystick, pointing stick, keypad, keyboard, camera, remote controller, or any other suitable input device.

As shown, the device 402 included in controller 104 may include communication lines or ports to enable the exchange of information with a network and/or other computing platforms, such as the client device 102 and agent 108. The processor 404 included in the device 402 may be configured to execute computer program modules via one or more of hardware, software, and/or firmware. Although one processor 404 is illustrated as being included in device 402, it is understood that the number of processors included in device 402 may vary in some other examples. The device 402 may be interfaced with other computers, such as an administration server, a monitoring system, a terminal device, and/or any other computers, through one or more interfaces not shown in this example. For example, such interfaces may be established, at least in part, via a network such as the Internet and/or any other suitable wired or wireless communication links in the art.

The processor 404 may include a host central unit (CPU) having multiple cores; however, any suitable processor may be employed, including a DSP, APU, GPGPU, or any other suitable processor or logical circuitry. The processor 404 may be bi-directionally connected to other components of the device 402 via the system bus 414. In this example, as shown, the processor 404 includes a registration component 406, an authentication component 408, a session component 410, a client access configuration component 412, and/or any other components.

The registration component 406 may be configured to receive a client registration request to register a client device 102. The client registration request received by registration component 406 may include identity information regarding the client device 102. The client device identity information may include information indicating a name (e.g., a computer name), one or more serial numbers (e.g., a MAC address of the Network Interface Card of the client device 102), a network address (e.g., IP address), and/or any other types of identifications associated with the client device 102. As discussed above, in one embodiment, the client registration request received by the registration component 406 encapsulates a hash value that was pre-assigned to the client device 102, which may be used to authenticate the client device 102 in accordance with the transport and security protocols described in U.S. Pat. No. 8,745,723.

The registration component 406 may be configured to receive an agent registration request to register an agent 108. The agent registration request received by registration component 406 may include identity information regarding the agent 108. The agent identity information may include information indicating a name, one or more serial numbers, a network address, and/or any other types of identifications associated with the agent 108. The registration component 406 may be configured to register the agent 108 based on the agent identity information included in the agent registration request. As discussed above, in one embodiment, the agent registration request received by the registration component 406 encapsulates a hash value that was pre-assigned to the agent 108, which may be used to authenticate the agent 108 in accordance with the transport and security protocols described in U.S. Pat. No. 8,745,723.

The authentication component 408 may be configured to authenticate the client device 102 in response to the client registration request being received. In some examples, the client device authentication performed by authentication component 408 may involve extracting client device identity information included in the received client registration request, requesting the client device 102 to provide credentials for authentication over the communication links, receiving the credentials from the client device 102, verifying the received credentials, and/or any other sub-operations. In one embodiment, the authentication component 408 may be configured to authenticate the client device 102 based on the hash value encapsulated in the client device registration request as discussed above.

The authentication component 408 may be configured to authenticate the agent 108 in response to the agent registration request being received. In some examples, the agent authentication performed by authentication component 408 may involve extracting identity information included in the received agent registration request, requesting the agent 108 to provide credentials for authentication over the communication links, receiving the credentials from the agent 108, verifying the received credentials, and/or any other sub-operations. In some examples, the authentication component 408 may be configured to authenticate the agent 108 based on the hash value encapsulated in the agent registration request as discussed above.

The session component 410 may be configured to establish a session with the client device 102, to communicate with the client device 102 through the session, and to terminate the session with the client device 102. Establishing the session with the client device by the session component 410 may involve setting up session information indicating the session with the client device 102 is alive. As illustration, a session ID and a session token may be created to represent the session, wherein the session token may include information such as the communication channel for communicating with the client device 102 (e.g., a socket), duration of the session, status of the client device 102, one or more messages received from client device in the session, and/or any other information. Communicating with the client device 102 by the session component 410 may involve intermittently checking whether the client device 102 is still alive or responsive, sending and/or receiving messages from the client device 102 using the session ID and/or the session token, and/or any other sub-operations. The messages received from the client device 102 through the session may include messages indicating specific instructions to the controller 104. For example, the messages may indicate to terminate the session, to request access to certain service(s) 110 provided by the server 106, to reconfigure the controller 104, and/or any other type of messages. Terminating the session for a client device 102 by the session component 410 may involve clearing or resetting the session information associated with the session. In some examples, the session component 410 may be configured to terminate the session with client device 102 after the client device indicates to terminate the session or is not responsive for a predetermined amount of time. For instance, the session component 410 may be configured to send keep-alive messages to the client device 102 soliciting whether the client device 102 is still "alive" (i.e., online). In response to the client device's instruction to terminate the session as a response to the keep-alive message, the session component 410 may be configured to terminate the session in the manner as described herein. In situations where the client device 102 does not respond to the keep-alive message within a predetermined amount of time after the keep-alive message is sent to the client device 102 (i.e., timeout occurs), the session component 410 may be configured to terminate the session with the client device 102.

The client access configuration component 412 may be configured to generate instructions to be transmitted to the agent 108 for removing or granting client device 102's access to the service(s) 110 provided by the server 106. In some implementations, the client access configuration component 412 may be configured to generate the aforementioned instructions in response to one or more messages received at controller 104. For example, in response to a message received from an administration server that indicates removing the client device 102's access to the server 106, the client access configuration component 412 may generate instructions for transmission to the agent 108, and the instructions may instruct the agent 108 to remove client device 102's access to the server 106. In some implementations, the client access configuration component 412 may be configured to remove or grant client device 102's access to the service(s) 110 provided by server 106 automatically based on the status of the session established between the client device 102 and the controller 104. For example, when the session is established for the first time or subsequently (i.e., from a disconnected state to a connected state), the client access configuration component 412 may transmit an instruction to the agent 108 instructing the agent 108 to grant client device 102 access to the server 106. Conversely, when the session is terminated, the client access configuration component 412 may transmit an instruction to the agent 108 instructing the agent 108 to remove client device 102's access to the service(s) 110 provided by server 106.

FIG. 5 is a flow diagram showing an exemplary method 500 of registering an agent and a client device at the controller in accordance with one embodiment of the disclosure. It will be described with reference to FIG. 4. The operations of method 500 presented below are intended to be illustrative. In some embodiments, method 500 may be accomplished with one or more additional operations not described and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an agent registration request may be received at the controller 104. The agent registration request received at operation 502 may include identity information regarding the agent 108. The agent identity information may include information indicating a name, one or more serial numbers, a network address, and/or any other types of identifications associated with the agent 108. In one embodiment, the agent registration request received at operation 502 is encapsulated with a hash value pre-assigned to the agent 108 at a configuration stage of the agent 108. In some implementations, operation 502 may be performed by a registration component the same as or substantially similar to the registration component 406 illustrated and described herein.

At an operation 504, the agent may be authenticated by the controller 104 in response to the agent registration request being received at operation 502. In some implementations, operation 504 may be performed by an authentication component the same as or substantially similar to the authentication component 408 illustrated and described herein.

At an operation 506, a client device registration request may be received at the controller 104. The client device registration request received at operation 506 may include identity information regarding the client device 102. The client device identity information may include information indicating a name, one or more serial numbers, a network address, and/or any other types of identifications associated with the client device 102. In one embodiment, the client device registration request received at operation 506 is encapsulated with a hash value pre-assigned to the client device 102 at a configuration stage of the client device 102. In some implementations, operation 506 may be performed by a registration component the same as or substantially similar to the registration component 406 illustrated and described herein.

At an operation 508, the client device may be authenticated by the controller 104 in response to the client device registration request being received at operation 506. In some implementations, operation 508 may be performed by an authentication component the same as or substantially similar to the authentication component 408 illustrated and described herein.

At an operation 510, a session is established at the controller 104 with the client device 102 in response to the client device being authenticated at operation 508. In some implementations, operation 510 may be performed by a session component the same as or substantially similar to the session component 410 illustrated and described herein.

At an operation 512, an instruction is generated at the controller 104 to cause the agent 108 to grant the client device 102 access to the server 106. In some implementations, operation 512 may be performed by a client access configuration component the same as or substantially similar to the client access configuration component 412 illustrated and described herein.

FIG. 6 is a flow diagram illustrating an exemplary method 600 of removing a client device's access at a controller in accordance with one embodiment of the disclosure. It will be described with reference to FIG. 4. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a request to disconnect a session with the client device 102 may be received at controller 104. In some implementations, operation 602 may be performed by a session component the same as or substantially similar to the session component 410 illustrated and described herein.

At an operation 604, the session with the client device is disconnected in response to the request to disconnect being received at operation 602. In some implementations, operation 604 may be performed by a session component the same as or substantially similar to the session component 410 illustrated and described herein.

At an operation 606, a determination is made as to whether the client device 102 still has access to the server 106. The determination made at operation 606 may involve querying the agent 108, querying one or more intermediate information servers, checking the status of client device 102 stored on the controller 104, and/or any other operations. For instance, as an illustration, without limitation, data storage coupled to the controller 104 may be checked for client device 102's status information, which may indicate whether the client device 102 still has or does not have access to the server 106. As shown, in the case where it is determined that the client device 102 does not have access to the server 106, the process 600 proceeds to end. In the case where it is determined that the client device 102 still has access to the server 106, the process 600 may proceed to operation 608. In some implementations, operation 606 may be performed by a client access configuration component the same as or substantially similar to the client access configuration component 412 illustrated and described herein.

At an operation 608, an instruction may be generated at controller 104 to cause the agent 108 to remove the client device 102's access to the server 106. In some implementations, operation 608 may be performed by a client access configuration component the same as or substantially similar to the client access configuration component 412 illustrated and described herein.

Figure 7:
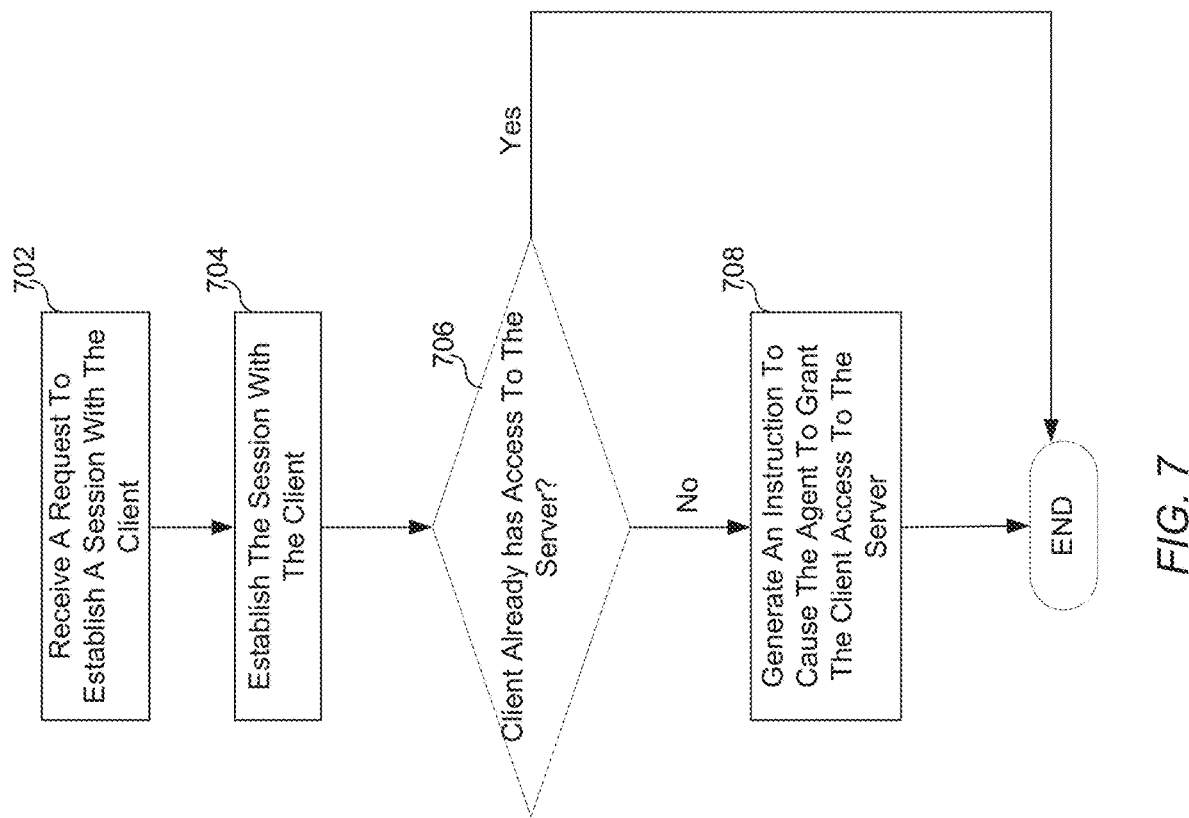
FIG. 7 is a flow diagram illustrating an exemplary method of granting a client device access at the controller shown in FIG. 4 in accordance with one embodiment of the disclosure.

FIG. 7 is a flow diagram illustrating an exemplary method 700 of granting a client device access at the controller shown in FIG. 4 in accordance with one embodiment of the disclosure. It will be described with reference to FIG. 4. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, a request to establish a session with the client device 102 may be received at controller 104. In some implementations, operation 702 may be performed by a session component the same as or substantially similar to the session component 410 illustrated and described herein.

At an operation 704, the session with the client device 102 is established in response to the request to connect being received at operation 702. In some implementations, operation 704 may be performed by a session component the same as or substantially similar to the session component 410 illustrated and described herein.

At an operation 706, a determination is made as to whether the client device 102 already has access to the server 106. The determination made at operation 706 may involve querying the agent 108, querying one or more intermediate information servers, checking the status of client device 102 stored on the controller 104, and/or any other sub-operations. For instance, as an illustration, without limitation, data storage coupled to the controller 104 may be checked for client device 102's status information, which may indicate whether the client device 102 already has or does not have access to the server 106. As shown, in the case where it is determined that the client device 102 already has access to the server 106, the process 700 proceeds to end. In the case where it is determined that the client device 102 does not have access to the server 106, the process 700 may proceed to operation 708. In some implementations, operation 706 may be performed by a client access configuration component the same as or substantially similar to the client access configuration component 412 illustrated and described herein.

At an operation 708, an instruction may be generated at controller 104 to cause the agent 108 to grant the client device 102 access to the server 106. In some implementations, operation 708 may be performed by a client access configuration component the same as or substantially similar to the client access configuration component 412 illustrated and described herein.

Figure 8:
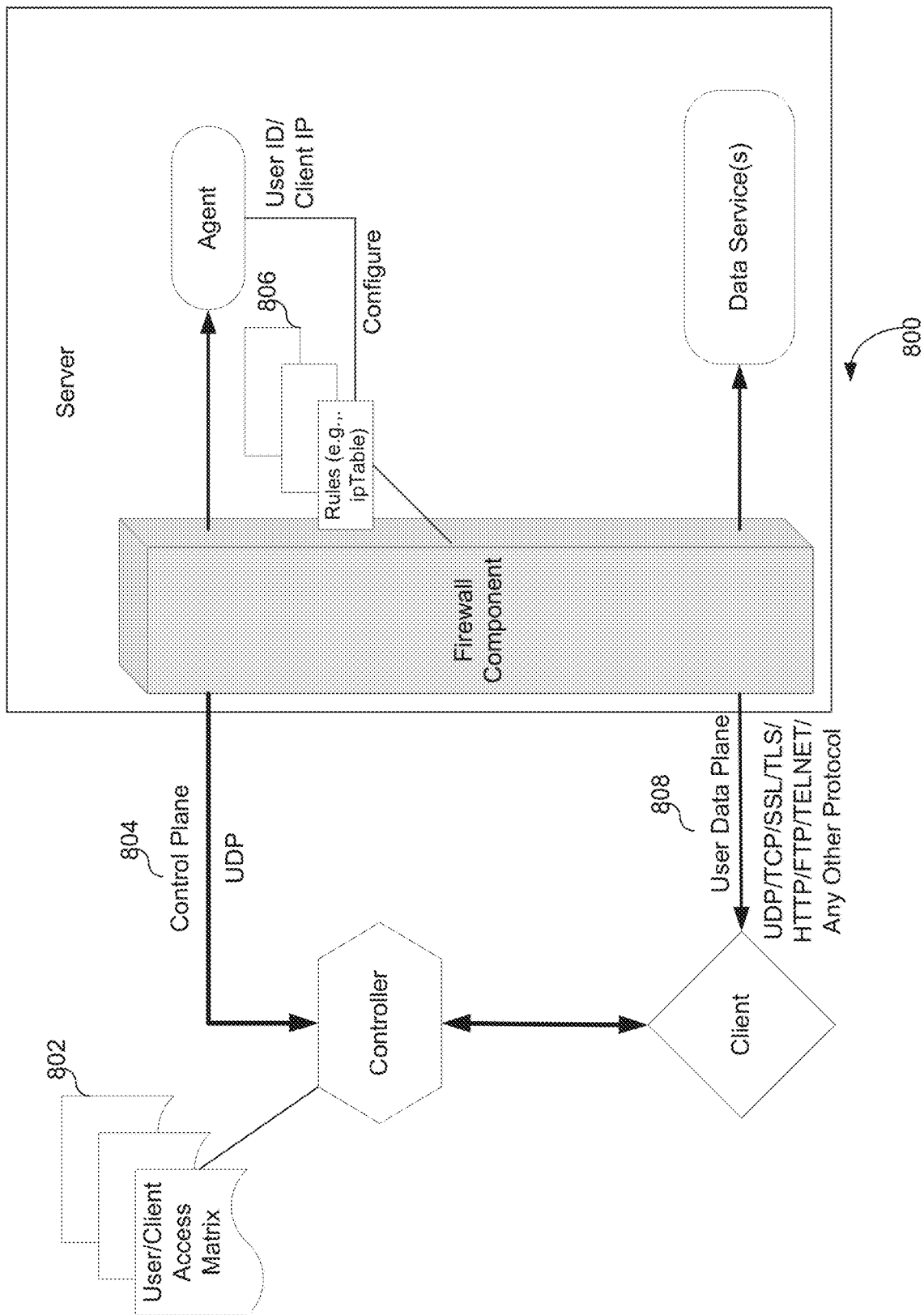
FIG. 8 illustrates one exemplary system facilitating the access control mechanism in accordance with one embodiment of the disclosure.
Figure 9:
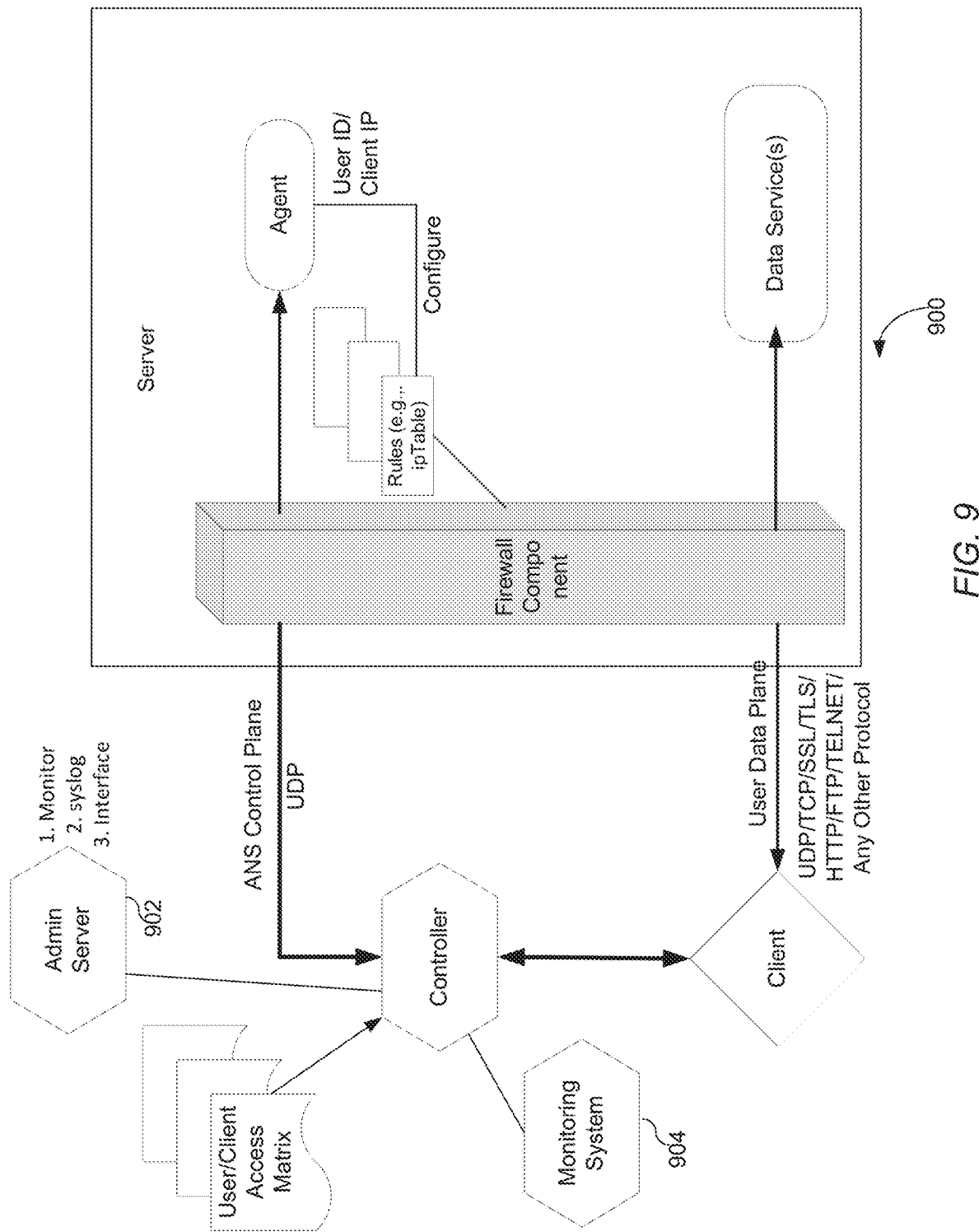
FIG. 9 illustrates another exemplary system facilitating the access control mechanism in accordance with one embodiment of the disclosure.

Attention is now directed to FIGS. 8 and 9, which illustrate two exemplary systems configured to facilitate the access control mechanism in accordance with two embodiments of the disclosure. As should be clear from FIGS. 8 and 9, the systems illustrated therein have more details than system 100 shown FIG. 1. The systems shown in FIGS. 8 and 9 are intended to be illustrations of two examples in accordance with the disclosure, and thus are not intended to be limiting.

FIG. 8 illustrates one exemplary system 800 for facilitating the access control mechanism in accordance with one embodiment of the disclosure. It will be described with comparison to FIG. 1. As shown in this exemplary system 800, the controller may have access to user/client device access matrix 802. For example, without limitation, the user/client device access matrix 802 may be stored in data storage coupled to the controller. The user/client device access matrix 802 may specify various access configurations for a user and/or corresponding client device 102. For example, for a given user, the user/client device access matrix 802 may specify that the given user may have access to a first service associated with a specific agent, say agent #1 from a specific client device, say client device #1. An example of such a access configuration is provided below Given User:Client Device #1; Has Access To Service #1
In this example the controller may be configured to verify whether a registration request or a request to establish a session is originating from a specific user in addition to authenticating that the requests are originating from a specific client device. User credential information such as username and password at the client device may be included in the aforementioned requests.

As also shown in this example, the controller may communicate with the agent using any one of suitable communication protocols, which may include UDP. The controller may issue instructions to remove or grant client device access to the server in response to the requests (e.g., registration requests, session disconnection requests, and/or session establishment requests as described herein) received from the client device and transmit the instructions to the agent. As shown in this example, in implementations, such instructions may be encapsulated in a control plane provided by the communication protocols facilitated by the communication link between the controller and the server. It should be understood the communication protocols listed in this example are merely illustrative. The communication between the controller and the server and/or the communication between the client device and the server may be implemented by any communication protocols as desired by the provider(s), administrator(s), manufacturer(s), and/or any other entities related to the server. In some embodiments of the disclosure, the communication link between the controller and the server is a secured communication link. In one embodiment of the disclosure, as discussed above, the communication between the controller and the server is via the transport and security protocol described in U.S. Pat. No. 8,745,723.

As also shown, in this example, the communication between the controller and the agent may be through the firewall component of the server. That is, the firewall component of the server may be configured to permit only authorized controller(s) to access the agent associated with the server. For example, such configuration may be at a device level (e.g., only controller with certain hardware or network address may have access to the agent).

As also shown in this example, the agent may acquire the user ID and/or client device network address such as the IP address from the instructions issued by the controller via the firewall component. The user ID may be used to verify if a requesting user has access to the server, and the client device network address may be used to configure the firewall component such that access to the server may be granted to the client device.

As illustration of how the access control mechanism may be facilitated by the system 800, the following scenario is provided: a given user may log into a client device and initialize an application (e.g., a browser); the browser then transmits a session establishment request requesting the controller to establish a session with the client device and requesting access to the web services provided by server; the controller may then use the user/client access matrix 802 to determine whether the user has permission to access the web services provided by the server; and, in response to determination that the user has the permission to access the web services provided by the server, the controller issues an instruction instructing the agent to grant the client device access to the web services provided by the server. In this example, the instruction generated by the controller may include user information regarding the given user that is active on the client device. At the agent, the instruction is received through the firewall component. The agent may extract user information from the instruction and determine on its own whether the user identified by the user information indeed has permission to access the web services provided by the server. In response to a determination that the given user has access to the web services provided by the server, the agent then configures the firewall component via the iptable command 806 illustrated in FIG. 8 and described herein to grant the client device access to the server (for example, add an entry in the firewall configuration to allow the client device to communicate with the server on port 80). In some examples, the agent may inform the client device that the client device has been granted access to the server via the controller. The client device may then transmit data to the server for receiving the data service(s) provided by the server via the communication link between the server and the client device. As shown, the transmission of the data provided by the data service(s) may be implemented using, for example, user datagram protocol (UDP), transport control protocol (TCP), secured socket layer (SSL), transport security layer (TLS), hypertext transport protocol (HTTP), file transfer protocol (FTP), Telnet, rich site summary (RSS), and/or any other standard or non-standard communication protocols for transmitting data between the server and client.

FIG. 9 illustrates another exemplary system 900 for facilitating the access control mechanism in accordance with one embodiment of the disclosure. It will be described with comparison to FIG. 8. As shown in this example, the controller may be operatively coupled to an administration server 902. The administration server 902 may be configured to provide administration service to enable an administrator to manage the controller. In implementations, to facilitate this, the administration server 902 may obtain event records from the controller and store in memory storage, such as memory cache, of the administration server 902. As also shown, the administration server 902 may be configured to keep system logs regarding the controller and/or the system 900 in general based on the event records obtained. As also shown, the administration server 902 may be configured to provide a user interface enabling the administrator of system 900 to view the events of system 900, the system logs, and/or any other administrative information regarding system 900. In some embodiments, the user interface may enable the administrator to configure the controller. For example, the administrator may be enabled to configure the controller to register a set of client devices only.

Also shown in this example is a monitoring system 904 coupled to the controller. In one implementation, the monitoring system 904 is an enterprise monitoring system. In this example, the controller is configured to provide an interface to the monitoring system 904 such that existing monitoring services available through the monitoring system may be used to monitor the events, activities, status, and/or any other information stored on the controller.

Figure 10:
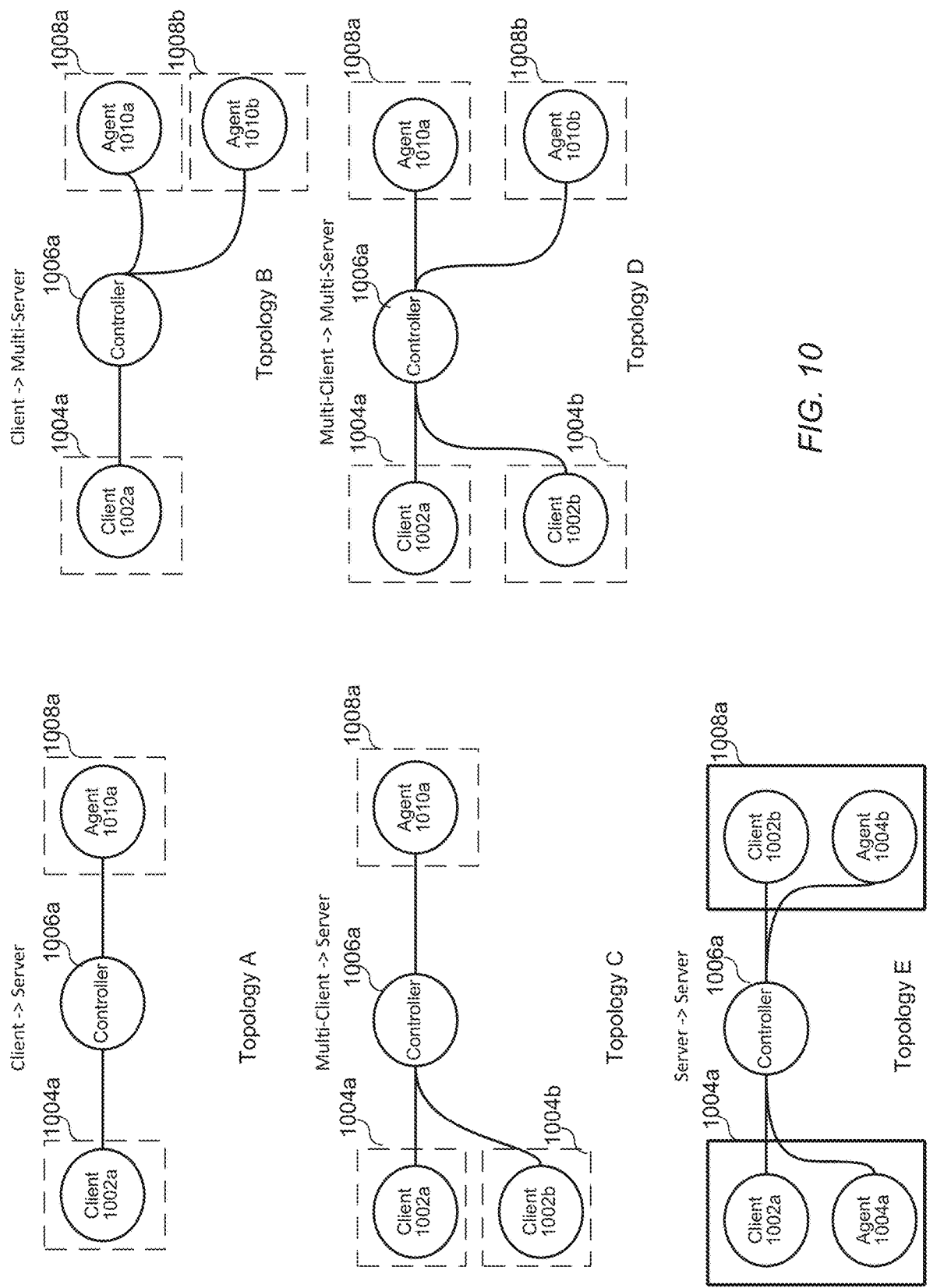
FIG. 10 illustrates various examples of topologies for configuring the client device, controller, and agent in accordance with the disclosure.

FIG. 10 illustrates various examples of topologies for configuring the client device, controller, and agent in accordance with the disclosure. Topology A illustrates a client device 1002a included in a client system 1004a, which may be connected to the controller 1006a such that the client device 1002a may register itself to the controller 1006a and/or establish/disconnect a session with the controller 1006a in a manner as described herein. As shown, in topology A, the controller 1006a is also connected to a system 1008a that comprises agent 1010a, such that the controller 1006a may issue instructions to the system 1008a instructing the agent 1010a to add/remove client device 1002a access to one or more services provided or controlled by system 1008a.

Topology B illustrates an example where the controller 1006a may be connected to multiple agents such as agents

1010*a* and 1010*b*. As shown, the individual agents connected to the controller 1006*a* in topology B may reside in separate host systems. In this example, agent 1010*a* resides in host system 1008*a* and agent 1010*b* resides in host system 1008*b*. Through topology B as shown, the access control mechanism in accordance with the disclosure enables a client device, such as the client device 1002*a*, to have access to services provided or controlled by host systems 1008*a* and 1008*b* via a single controller 1006*a*. It should be understood, although only two agents are shown in this example as connected to the controller 1006*a*, this is not intended to be limiting. The number of agents that may be connected to the controller 1006*a* in accordance with topology B may be however many as desired by the provider(s), administrator(s), manufacturer(s), and/or any other entities related to controller 1006*a*.

Topology C illustrates an example where the controller 1006*a* may be connected to multiple client systems such as the client devices 1002*a* and 1002*b*. As shown, the individual client devices connected to the controller 1006*a* in topology C may reside in separate client systems. In this example, client device 1002*a* resides in client system 1004*a* and client device 1002*b* resides in client system 1004*b*. Through topology C as shown, the access control mechanism in accordance with the disclosure enables an agent, such as the agent 1010*a*, to control access of multiple client devices to the service(s) provided or controlled by the host system 1008*a*. It should be understood, although only two client devices are shown in this example as connected to the controller 1006*a*, this is not intended to be limiting. The number of client devices that may be connected to the controller 1006*a* in accordance with topology C may be however many as desired by the provider(s), administrator(s), manufacturer(s), and/or any other entities related to controller 1006*a*.

Topology D illustrates an example where a controller 1006*a* may be connected to multiple client devices and multiple agents. Topology D provides great flexibility for controlling access of multiple client devices to services provided by multiple host systems. In one example, the controller 1006*a* in topology D is configured with the capability to issue instructions to a suitable agent for granting or removing access to a client device connected to controller 1006*a*.

Topology E illustrates an example where a controller 1006*a* may be connected to a system 1004*a* comprising a client 1002*a* and an agent 1004*a* and connected to a another system comprising a client 1002*b* and an agent 1004. Topology E provides great system integrity and/or reliability for controlling client devices residing on the same system through a single controller and a single host system. Topology E illustrates, in accordance with the present disclosure, a computer system, such as system 1004*a* or 1008*a* shown in this example, may be configured as a client whose access to data service(s) provided by a server is controlled by some other agent(s); and may also be configured to serve as an agent to control access of some other client(s) to data service(s) provided by the same or a different server. Such a topology provides great flexibility and high availability to the access control mechanism disclosed herein.

It should be understood that the examples of different topologies shown in FIG. 10 are merely illustrative and thus not intended to be limiting. Other topologies by which the controller, client device(s) and/or the agent(s) are contemplated. It should also be appreciated that although the controller, client device(s), and agent(s) are illustrated as residing on different systems, this is not intended to be limiting. It is contemplated that any combination of client device(s), agent(s), and controller(s) may reside on the same system or device. For example, the host system 1008*a* shown in topology A may comprise one or more clients and/or one or more controllers in addition to the agent 1010*a* shown. That is the host system 1008*a* may be configured to execute a client, a controller, and/or a data service provider. It is contemplated that any node on the access control network in accordance with the disclosure may be dynamically configured to be a client, a controller, and/or a data service provider. For example, without limitation, at time T, the host system 1008*a* may be configured to serve as an agent 1008*a* as shown in topology A, and at time T+1, the host system 1008 may be configured to serve as an agent as well as a client as shown in topology E. One of ordinary skills in the art would appreciate configuring a host system in such a dynamic manner to facilitate may achieve flexible mesh network configuration and/or high availability for the access control mechanism in accordance with the disclosure.

Figure 11:
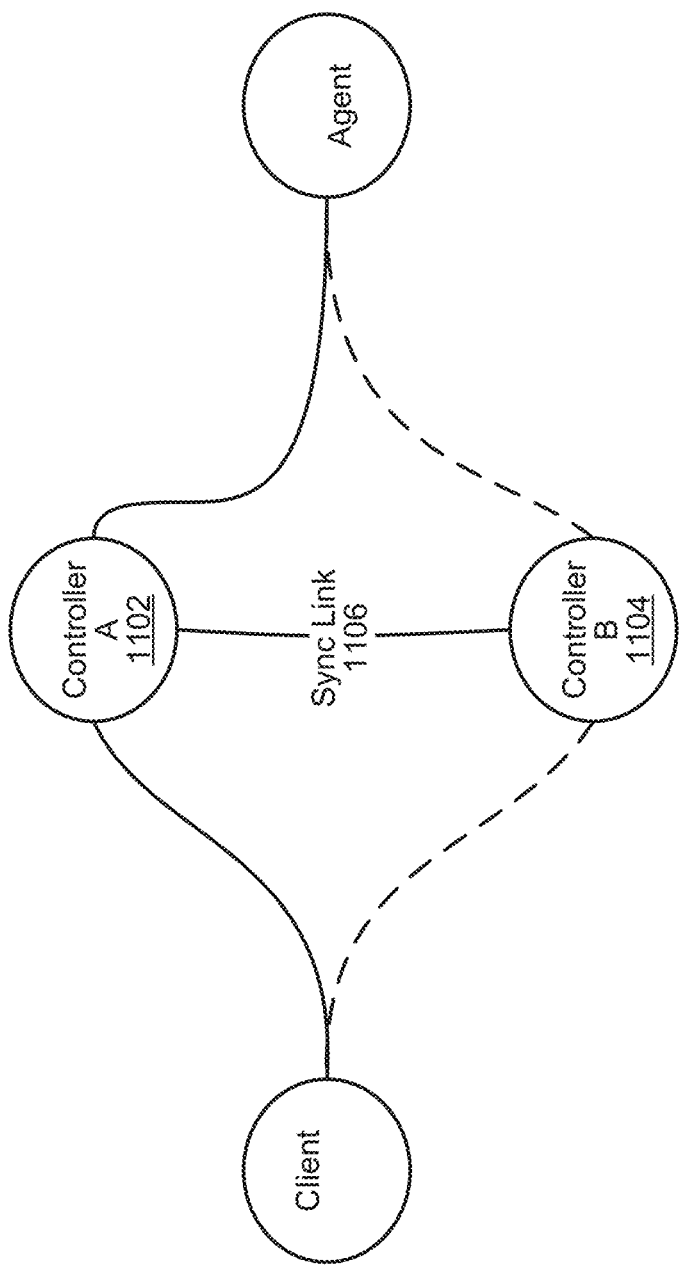
FIG. 11 illustrates one example of providing redundancy at the controllers in accordance with the disclosure.

FIG. 11 illustrates one example of providing redundancy through multiple controllers in accordance with the disclosure. As shown in this example, multiple controllers may be provided to facilitate failover protection in case one or more controllers are out of service or malfunctioning. In this example, two controllers, 1102 and 1104, are employed. The controller 1102 is the primary controller, such that the access control mechanism is facilitated by controller 1102 between the client and agent described herein. The controller 1104 is the backup controller in this example. As shown, between the controller 1102 and the controller 1104, a synchronization link 1106 may be established. In some implementations, the synchronization link 1106 may be used to transmit various information between the controllers 1102 and 1104. The information may include the status of the controller 1102 and/or 1104, activities at controller 1102 since last synchronization, activities at 1104 since last synchronization, and/or other information. In one embodiment, the controller 1104 keeps all the activities that have taken place at controller 1102 such as which one or ones of client devices have a session with the controller 1102 (e.g., logged-in on controller 1102), what access has been granted and/or removed for those client devices, statuses of client devices registered at controller 1102, and/or any other information. In that embodiment, the controller 1104 is configured to take over controller 1102 in the event that controller 1102 fails to synchronize controller 1104 over a predetermined period of time or controller 1102 announces to controller 1104 to take over. To take over, the controller 1104 may announce itself to client and agent that controller 1102 is down and controller 1104 has taken over. The controller 1104 may then be switched to the primary controller and the controller 1102 may be switched to the backup controller. The synchronization between controllers 1102 and 1104 may resume once controller 1104 is back online again. In some examples, controller 1102 remains the backup controller until controller 1104 fails over. In some examples, controller 1102 takes over and resumes being the primary controller as soon as it is back up online.

Implementations of the invention may be made in hardware, firmware, software, or various combinations thereof. The invention may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. An agent component configured to facilitate access control for a client device to access one or more services that are provided by a server, wherein the server includes the agent component and a firewall, wherein the client device is registered with a controller through a client registration request that includes identity information identifying the client device, the agent component comprising:
one or more physical processors configured by machine-readable instructions to:
transmit an agent registration request from the agent component to register the agent component with the controller, the agent component being associated with the server;
receive an initial access grant instruction from the controller, wherein the initial access grant instruction causes the agent component to grant the client device access to the server for the first time;
responsive to receiving the initial access grant instruction, dynamically configure the firewall to grant the client device access to the server; and
receive control instructions from the controller, wherein the control instructions cause the agent component to control the firewall, wherein the firewall controls access by the client device to the server, wherein the control instructions are based on whether a current session with the client device is established and whether access to the server is granted to the client device such that:
responsive to the current session not being established and the access to the server being granted to the client device, a first control instruction to cause the agent component to control the firewall to remove the access by the client device to the server is received by the agent component, and
responsive to the current session being established and the access to the server not being granted to the client device, a second control instruction to cause the agent component to control the firewall to grant the client device access to the server is received by the agent component;
wherein the agent component is protected by the firewall, and wherein the agent component is adapted to dynamically configure the firewall to grant and/or remove access by the client device to the service; and
facilitate intermittently terminating and establishing sessions with the client device, wherein a first session is terminated in response to a determination that the client device is not responsive to one or more checks by the controller, and wherein a second session is established in response to activity by the client device.

2. The agent component of claim 1, wherein the agent component and the client device are configured to register with the controller during startup.

3. The agent component of claim 1, wherein the controller is protected by the firewall.

4. The agent component of claim 1, wherein the agent component is configured to receive the control instructions from the controller through the firewall.

5. The agent component of claim 1, wherein the identity information included in the client registration request comprises information indicating an internet protocol (IP) address associated with the client device.

6. The agent component of claim 1, wherein the receipt of the control instructions by the agent component is effectuated using user datagram protocol (UDP) or a transport layer protocol.

7. The agent component of claim 1, wherein the one or more physical processors are further configured to authenticate the agent component after the agent registration request has been transmitted and/or to authenticate the client device after the client registration request has been transmitted.

8. The agent component of claim 1, wherein the one or more physical processors are further configured to generate instructions to cause the client device to authenticate the controller subsequent to use of the client registration request and/or to generate instructions to cause the agent component to authenticate the controller subsequent to transmission of the agent registration request.

9. The agent component of claim 1, wherein the one or more physical processors are further configured to generate a system log and to provide the system log to an administration server over a network.

10. A method for facilitating access control for a client device to access one or more services that are provided by a server, the server including an agent component and a firewall, wherein the client device is registered with a controller through a client registration request that includes identity information identifying the client device, the method being implemented in a physical processor configured by machine-readable instructions to execute computer programs, the method comprising:
transmitting an agent registration request from the agent component to register the agent component with the controller, the agent component being associated with the server;
receiving an initial access grant instruction from the controller, wherein the initial access grant instruction causes the agent component to grant the client device access to the server for the first time;
responsive to receiving the initial access grant instruction, dynamically configuring the firewall to grant the client access to the server; and receiving control instructions from the controller, wherein the control instructions cause the agent component to control the firewall, wherein the firewall controls access by the client device to the server, wherein the control instructions are based on whether a current session with the client device is established and whether access to the server is granted to the client device such that:

responsive to the current session not being established and the access to the server being granted to the client device, a first control instruction to cause the agent component to control the firewall to remove access by the client device to the server is received by the agent component, and responsive to the current session being established and the access to the server not being granted to the client device, a second control instruction to cause the agent component to control the firewall to grant the client device access to the server is received by the agent component;

wherein the agent component is protected by the firewall, and wherein the agent component is adapted to dynamically configure the firewall to grant and/or remove the access by the client device to the server; and facilitating intermittently terminating and establishing sessions with the client device, wherein a first session is terminated in response to a determination that the client device is not responsive to one or more checks by the controller, and wherein a second session is established in response to activity by the client device.

11. The method of claim 10, wherein the agent component and the client device are configured to register with the controller during startup.

12. The method of claim 10, wherein the controller is protected by the firewall.

13. The method of claim 10, wherein the agent component receives the control instructions from the controller through the firewall.

14. The method of claim 10, wherein the identity information included in the client registration request comprises information indicating an internet protocol (IP) address associated with the client device.

15. The method of claim 10, wherein the receipt of the control instructions by the agent component is effectuated using user datagram protocol (UDP) or a transport layer protocol.

16. The method of claim 10, further comprising authenticating the agent component after the agent registration request has been transmitted and/or authenticating the client device after the client registration request has been transmitted.

17. The method of claim 10, further comprising generating instructions to cause the client device to authenticate the controller subsequent to use of the client registration request and/or generating instructions to cause the agent component to authenticate the controller subsequent to transmission of the agent registration request.

18. The method of claim 10, further comprising generating a system log and providing the system log to an administration server over a network.

* * * * *